United States Patent [19]

Uchida

[11] Patent Number: 5,249,244
[45] Date of Patent: Sep. 28, 1993

[54] OPTICAL DEVICE WITH AN OPTICAL COUPLER FOR EFFECTING LIGHT BRANCHING/COMBINING AND A METHOD FOR PRODUCING THE SAME

[75] Inventor: Mamoru Uchida, Yokohama, Japan

[73] Assignee: Canon Kabushiki Kaisha, Tokyo, Japan

[21] Appl. No.: 850,292

[22] Filed: Mar. 12, 1992

[30] Foreign Application Priority Data

Mar. 12, 1991 [JP] Japan ................. 3-072291

[51] Int. Cl.$^5$ ............................ G02B 6/26; G02B 6/20
[52] U.S. Cl. ................................... 385/15; 250/227.11
[58] Field of Search ............................... 385/12-16; 250/227.11; 333/141, 150, 157; 356/352; 357/17, 19

[56] References Cited

U.S. PATENT DOCUMENTS

| | | | |
|---|---|---|---|
| 4,589,729 | 5/1986 | Bridges et al. | 385/15 X |
| 4,708,423 | 11/1987 | Erman et al. | 350/96.15 |
| 4,789,214 | 12/1988 | Vilhelmsson et al. | 385/15 X |
| 4,888,785 | 12/1989 | Lee | 372/50 |

FOREIGN PATENT DOCUMENTS

0179507 4/1986 France .

OTHER PUBLICATIONS

"Mach-Zehnder Modulators and Optical Switches on III-V Semiconductors" by Erman et al., Journal of Lightware Tech. vol. 6, Jun. 1988 pp. 837-846.
Osinski, et al., "Miniature Integrated-Optic Beam Splitter in AlGaAs/GaAs Ridge Waveguides," Optical Fiber Communication Conference and Sixth International Conference on Integrated Optics and Optical Fiber Communication Technical Digest, Jan. 1987, one page.
Osinski, et al., "Miniature Integrated Optical Beam-Splitter in AlGaAs/GaAs Ridge Waveguides", Electronics Letters, vol. 23, No. 21, Oct. 1987, pp. 1156 through 1158.

*Primary Examiner*—Akm E. Ullah
*Attorney, Agent, or Firm*—Fitzpatrick, Cella, Harper & Scinto

[57] ABSTRACT

Disclosed are an optical device having an optical coupler and a method for fabricating the optical device. The optical device includes a semiconductor crystal and a waveguide formed on the semiconductor crystal. The waveguide includes an etched portion having a predetermined pattern and a predetermined depth. A re-grown portion is formed in the etched portion of the waveguide. A coupler portion containing a recess is formed in the re-grown portion. The coupler portion effects at least one of a branching and a combining of the light propagated through the waveguide. In a method for fabricating the device, the etched portion is formed typically by ion beam etching, and the recess is formed typically by focused ion beam etching. In the method, the etching and the re-growth are performed using the same mask material.

13 Claims, 5 Drawing Sheets

OPTICAL DEVICE WITH AN OPTICAL COUPLER FOR EFFECTING LIGHT BRANCHING/COMBINING AND A METHOD FOR PRODUCING THE SAME

BACKGROUND OF THE INVENTION

1. Field of the Invention

The present invention relates to an optical device including an integrated optical coupler for effecting light branching and/or combining by splitting the wavefront of a propagated light wave for use in opto-electrical and optical integrated circuits, compound-resonators and the like which are needed in the field of optical communication and the like. The present invention also relates to a method for forming an optical coupler in a waveguide of an optical device.

2. Related Background Art

In recent years, there has been a rapid growth in the importance of opto-electrical integrated circuits when optical and electrical devices are integrated on a common substrate. In the field of optical communication, there is a need to integrate a plurality of devices having different structures. However, the present process technology thereof has not yet satisfied the design needs in that field. For example, a directional coupler type optical coupler or a branching and/or combining device has a structure that can be readily designed, but the length of this device is more than 1 mm. Therefore, the degree of integration cannot be increased, and at the same time the process accuracy becomes a problem.

On the other hand, as an example that is suitable for the integrated structure, there has been proposed a beam splitter type branching and/or combining device as is disclosed in the "Journal of Light Wave Technology", Vol. 16, No. 6, pp. 837–846, 1988. FIG. 1 shows a plan view of this type of beam splitter 64. In FIG. 1, there are formed an input port 61 and output ports 62 and 63. The power of the light entering the input port 61 is branched and propagated through the two output ports 62 and 63 by the beam splitter 64. The device shown in FIG. 1 is fabricated as follows.

FIG. 2 is a cross-sectional view of the port or waveguide portion in FIG. 1. After an n-type $Al_{0.1}Ga_{0.9}As$ layer 72 is grown on an n-type GaAs substrate 71 by the metal organic vapor phase epitaxy (MOVPE) method, a groove 77 is formed for controlling a lateral mode of the waveguide portion. An n-type GaAs core layer 73 is then buried flatly by the chloride vapor phase epitaxy method, and an n-type $Al_{0.5}Ga_{0.5}As$ layer 74, an n-type $Al_{0.1}Ga_{0.9}As$ layer 75 and a p-type GaAs layer 76 are grown thereon by the MOVPE method.

The structure of the beam splitter 64 is produced by perpendicularly forming a groove in the GaAs core layer 73. The groove 64 forms an angle of 45 degrees relative to the waveguide, and its depth is stopped halfway in the GaAs core layer 73. At the beam splitter 64, the beam propagated through the input port 61 is branched by the depth of the perpendicular groove 64 with respect to a straightforward direction or a direction toward the port 63, while the beam is branched by the surface of the groove 64 functioning as a total reflection mirror with respect to a right-angle direction or a direction toward the port 62.

In this prior art device, however, sufficiently satisfactory characteristics could not be obtained because the groove 64 is formed by a normal reactive ion etching (RIE) method. As is also described in the above-mentioned article, the fabrication accuracy of the RIE method cannot satisfy the requirements of the design of groove 64. In order to increase the fabrication accuracy, the focused ion beam etching (FIBE) method may preferably be used. However, the FIBE method has considerable drawbacks, and this method is not utilized widely.

The first problem of a fabrication method using the FIBE method is that damage will be generated in an etched surface, especially, in the core portion of a waveguide. This results in sources of waveguide losses and degradation of the waveguide. Normally, the damage of dry etching such as the FIBE method, can be optically understood as the decrease of a band gap in an energy band structure of the waveguide. Therefore, influences become great when an optical coupler such as the above-discussed groove 64 shares the waveguide with a waveguide having a gain for propagated light, such as waveguides containing an optical amplifier and an active filter, for example.

The second problem with using the FIBE method is in that its throughput is low and its yield and reproducibility are poor. The process accuracy of a branching and/or combining portion should be sufficiently high since the manner of branching and combining is determined by the relationship of the branching and/or combining portion with a field profile or distribution of a light wave propagated through the waveguide. In the case of an integrated coupler/splitter, this becomes a serious problem.

SUMMARY OF THE INVENTION

An object of the present invention is to provide an optical device with an integrated optical coupler and a method for fabricating the optical device with the optical coupler suitable for use in semiconductor opto-electrical circuits and the like and having excellent reliability and reproducibility.

According to one aspect of the optical device of the present invention, the optical device comprises a a semiconductor crystal and a waveguide formed on the semiconductor crystal. The waveguide includes an etched portion having a predetermined pattern and a predetermined depth, and a re-grown portion is formed in the etched portion of the waveguide. A coupler portion containing a recess is formed in the re-grown portion. The coupler portion effects at least one of a branching and a combining of light propagated through the waveguide.

More concretely, the waveguide comprises a core layer and the re-grown portion comprises at least one semiconductor layer having a bandgap larger than that of the core layer of the waveguide. The re-grown portion comprises a light guide layer and a cladding layer. The waveguide comprises a core layer, and the etched portion has a depth beyond the core layer and the recess is formed in a slit shape beyond the core layer. The waveguide includes a crossing portion and the coupler portion is formed at the crossing portion. The recess comprises a curved slit for branching a light wave propagated through the waveguide in a plurality of directions. The semiconductor crystal comprises a plurality of layers of compound semiconductor layers and a plurality of waveguides having an optical device may be monolithically integrated on the compound semiconductor layers.

According to one aspect of the method for fabricating an optical device of the present invention, the method comprises the steps of providing a semiconductor crystal, forming a mask material having a predetermined pattern on the semiconductor crystal, performing etching of the semiconductor crystal with a predetermined depth using the mask material as a mask, performing an epitaxial re-growth selectively only into a portion etched in the etching step using the mask material as a mask, and performing a fine working in an epitaxial re-growth portion formed in the re-growth step to form a coupler portion.

The etching step is performed by a ion beam etching method, and a mesa etching is performed in the etching step. A fine working step is performed by a focused ion beam etching method. A light guide layer and a cladding layer are re-grown in the re-growth step, and the semiconductor crystal comprises a plurality of layers of compound semiconductor layers, when a plurality of waveguides having an optical device are monolithically integrated on the compound semiconductor layers.

In the above-discussed structure, the etched surface is damaged by the FIBE method and the like, but the damage will not bring forth absorption losses since the damage exists solely in the regrown layer having an appropriate band gap (typically a relatively large band gap). Consequently, the etching conditions in the FIBE method and the like can be optimized for enhancing only the fabrication accuracy without considering other factors.

These advantages and others will be more readily understood in connection with the following detailed description, claims and drawings.

DESCRIPTION OF THE PREFERRED EMBODIMENT

Figure 1:
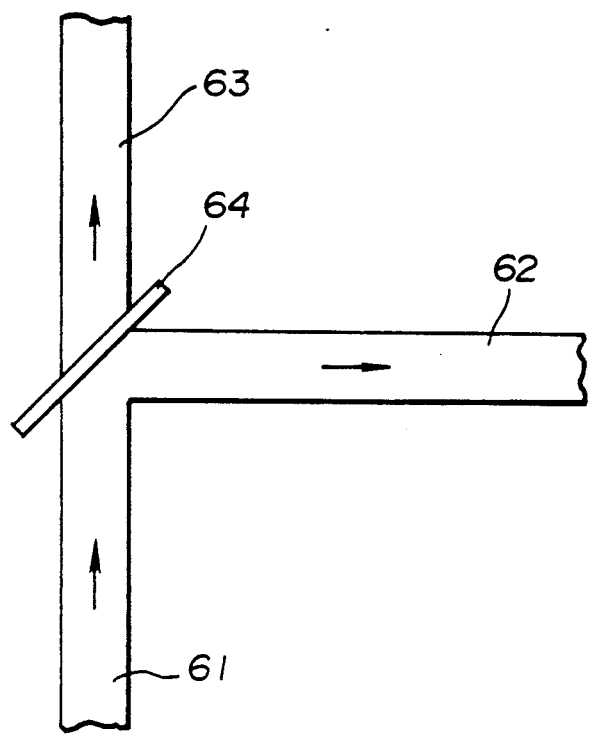
FIG. 1 is a schematic plan view of a prior art optical branching and/or combining device.
Figure 2:
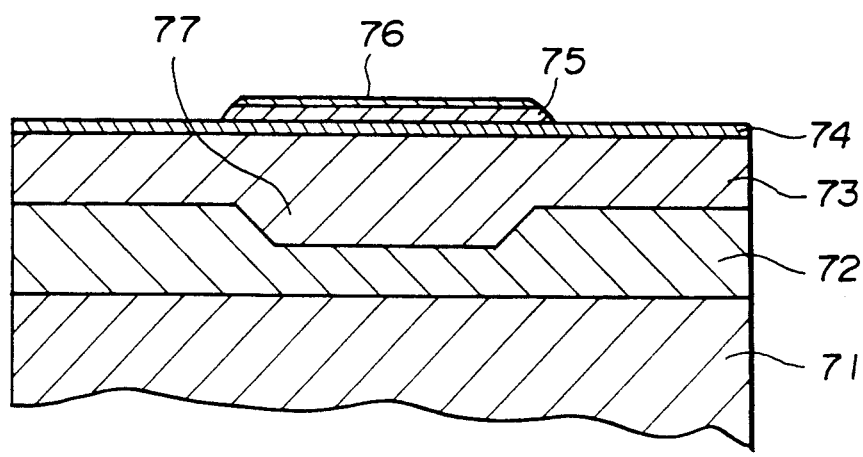
FIG. 2 is a cross-sectional view of a waveguide portion of FIG. 1.
Figure 3:
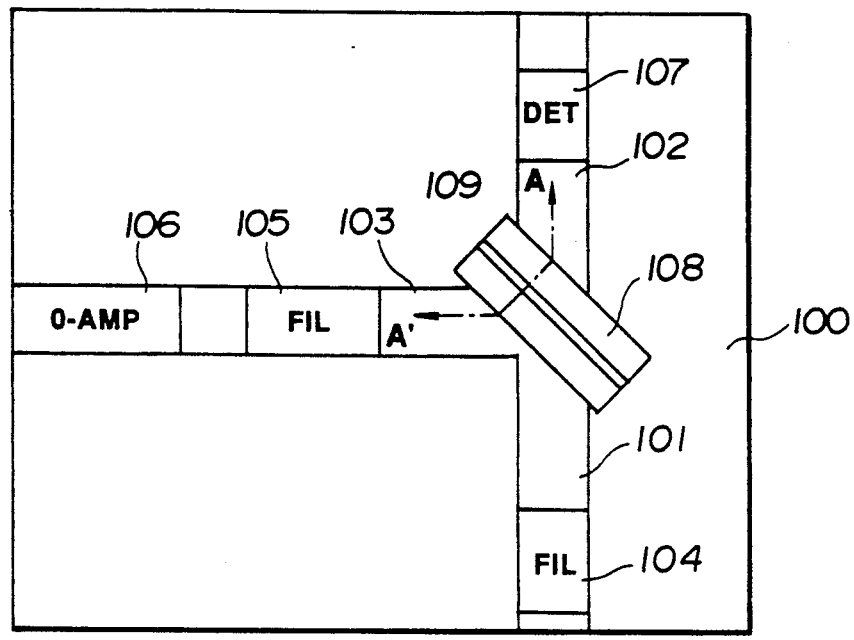
FIG. 3 is a plan view of a first embodiment of a beam splitter/coupler of the present invention.

FIG. 3 illustrates a first embodiment of the present invention containing a T-branch coupler/splitter. In FIG. 3, reference numeral 100 designates layers layered on a GaAs substrate 111 (see FIG. 4). Reference numerals 101, 102 and 103 respectively designate waveguides, and reference numerals 104 and 105 respectively designate filters formed in the waveguides 101 and 103, respectively. Reference numeral 106 designates an optical amplifier formed in the waveguide 103. Reference numeral 107 designates a photodetector 107 formed in the waveguide 102. Reference numeral 108 designates an optical coupler/splitter (simply referred to as a coupler region or portion) formed at a crossing part of the waveguides 101, 102 and 103 and reference numeral 109 designates a very thin or fine groove or slit formed by the FIBE method in an etched area formed by dry etching.

Figure 4:
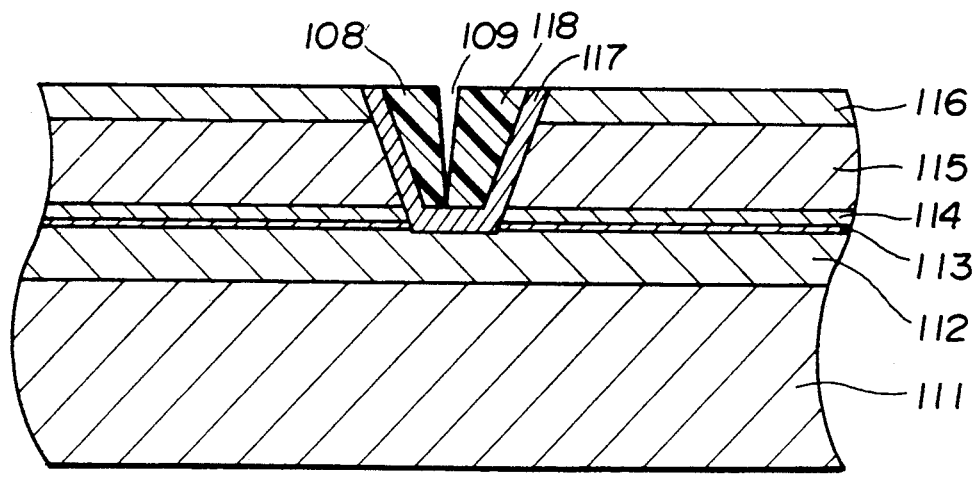
FIG. 4 is a cross-sectional view taken along a line A—A' of FIG. 3.

FIG. 4 shows a cross section of the waveguide portion taken along a line A—A' or a direction perpendicular to an extending direction of the groove 109. In FIG. 4, there are formed, on the GaAs substrate 111, a first cladding layer 112, a core layer 113, a light guide layer 114, a second cladding layer 115, a cap layer 116, a light guide layer 117 re-grown in the coupler portion 108 and a cladding layer 118 re-grown in the coupler portion 108.

Figure 5A:
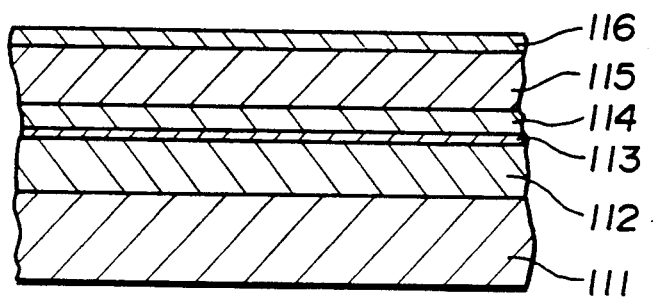
FIGS. 5A-5C are cross-sectional views for showing fabrication steps of a waveguide portion of FIG. 3.
Figure 5B:
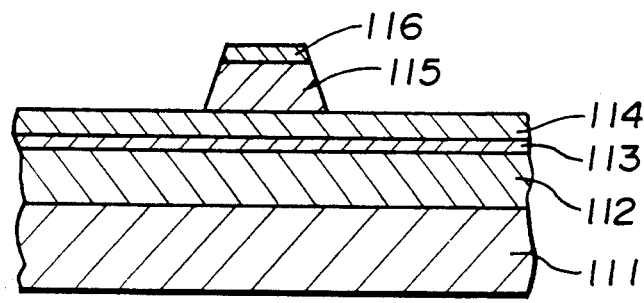
Figure 5C:
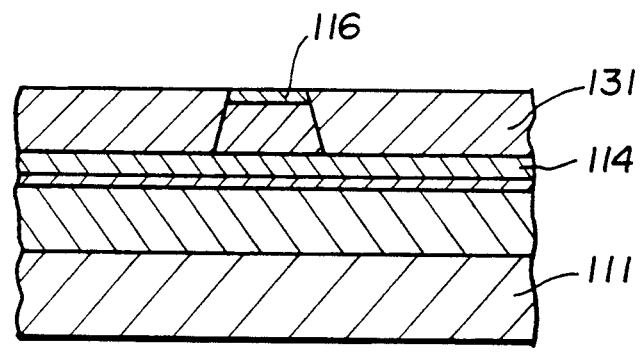

A fabrication method of the first embodiment will be described referring to FIGS. 5A-5C and 6A-6C. In FIG. 5A, the n-type $Al_{0.5}Ga_{0.5}As$ first cladding layer 112 having a thickness of 1.5 μm, the GaAs core layer 113 having a thickness of 0.05 μm, the p-type $Al_{0.3}Ga_{0.7}As$ light guide layer 114 having a thickness of 0.3 μm, the p-type $Al_{0.5}Ga_{0.5}As$ second cladding layer 115 having a thickness of 1 μm and the p-type GaAs cap layer 116 having a thickness of 0.5 μm are layered on the n-type GaAs substrate 111 in this order by the molecular beam epitaxy (MBE) method. A mesa etching in a stripe shape is then performed in order to control the mode in a lateral direction, i.e., to perform the confinement of the waveguides 101, 102 and 103 in the lateral direction. In this embodiment, the stripe width is 3 μm, and the etching is conducted to the depth of the light guide layer 114 as shown in FIG. 5B. Next, a high-resistance burying layer, for example, Fe-doped $Al_{0.5}Ga_{0.5}As$ 131, is selectively re-grown flatly by the MOVPE method as shown in FIG. 5C. The layer 131 is buried flatly to increase the accuracy in a following etching step. The burying layer 131 may be replaced by an n-type or high-resistance GaAs layer. In this case, propagation losses occur to some extent since the waveguide becomes a complex index waveguide type or absorption loss type.

Figure 6A:
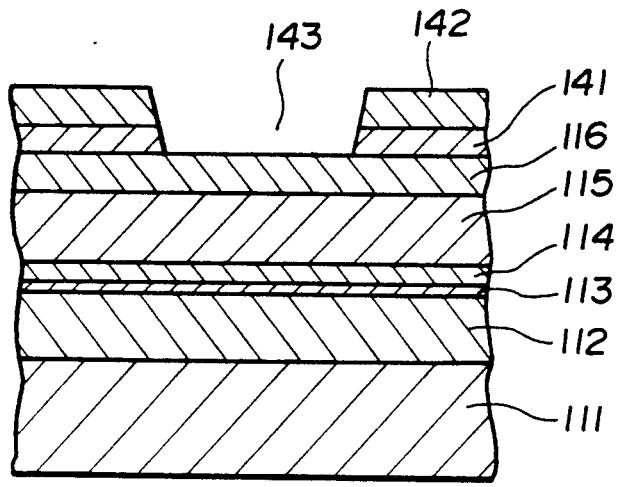
FIGS. 6A-6C are cross-sectional views for showing fabrication steps of an optical coupler portion of FIG. 3.
Figure 6B:
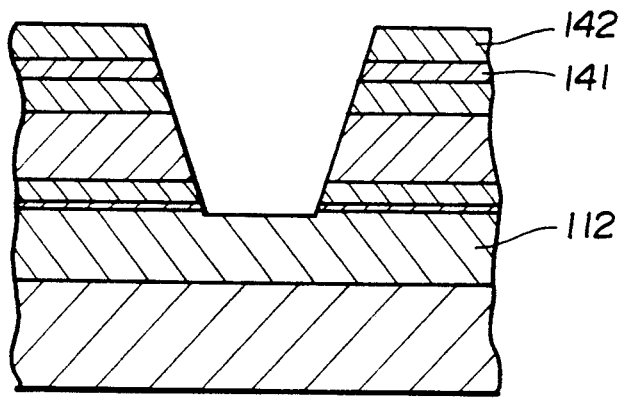
Figure 6C:
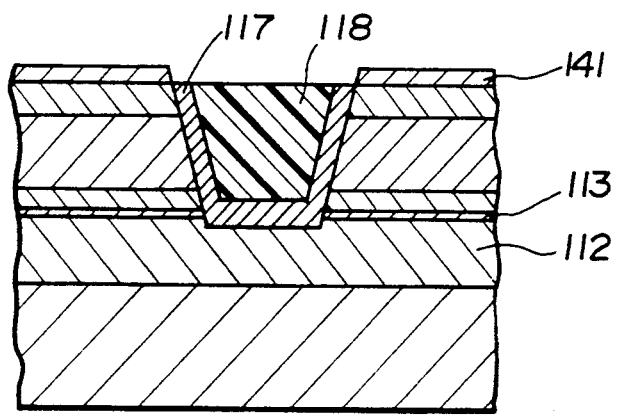

An etching pattern is formed at the coupler portion 108. As shown in FIG. 6A, after a sputtering layer ($SiO_2$ layer) 141 is formed to a thickness of 100 nm on a surface of the crystal, an opening 143 having a width of 5 μm and a length of 10 μm is patterned with a photoresist 142 and the pattern is transferred to the $SiO_2$ layer 141 using dry etching. The pattern is located at the crossing portion of the waveguides 101, 102 and 103, and the angle thereof relative to the waveguide is set to 45 degrees, as shown in FIG. 3. A reaction ion etching (RIE) method is used for the etching, and the etching depth is set to the point of the first cladding layer 112 as shown in FIG. 6B. Further, the etching condition is controlled so that the cross-sectional shape of etching becomes a trapezoid as shown in FIG. 6B. Thus, the etched surface is inclined, so that a following re-growth becomes easy. Thereafter, only the resist layer 142 is removed, and the semiconductor layers 117 and 118, having a larger band gap than that of the core layer 113, are selectively re-grown in the etched portion, by the MOVPE method, with the remaining $SiO_2$ layer 141 being used as a mask, as shown in FIG. 6C.

In this embodiment, the etching and the selective re-growth are performed using the same mask. Namely, they are conducted by a self-alignment method. Therefore, its reproducibility is greatly improved. The light confinement in the direction of the layered layers is achieved completely by layering two layers of the light guide layer 117 and the cladding layer 118 as re-growth layers. Further, the wafer surface is made flat without any stepped areas. When permitted, using only the light guide layer 117 will suffice.

Next, the pattern (the groove 109) of the coupler 108 is etched in the re-grown area 117 and 118 by the FIBE method. As etching conditions, an ion seed of Ga+, beam current of 40 pA and acceleration voltage of 30 kV are preferable. The etching depth at this time is controlled to be stopped in the re-grown light guide layer 117.

The operation of the first embodiment will be explained. As shown in FIG. 3, light propagated along the core layer 113 (see FIG. 4) of the waveguide 101 through the filter 104 is split and reflected at the coupler portion 108, and is supplied to the waveguides 102 and 103. Conversely, light beams propagated in the waveguides 102 and 103 are partly combined by the coupler portion 108, and are supplied to the waveguide 101.

Generally, when the layered layer is etched by the FIBE method, the layer is damaged and its band gap is most likely to be effectively narrowed. In this embodiment, however, damage such as propagation losses is reduced because the band gap of the portion at which the groove 109 is etched is made larger than that of the core layer 113. Therefore, the band gap of that portion approaches that of the core layer 113, even if the band gap were narrowed owing to damage caused by the etching.

Figure 7:
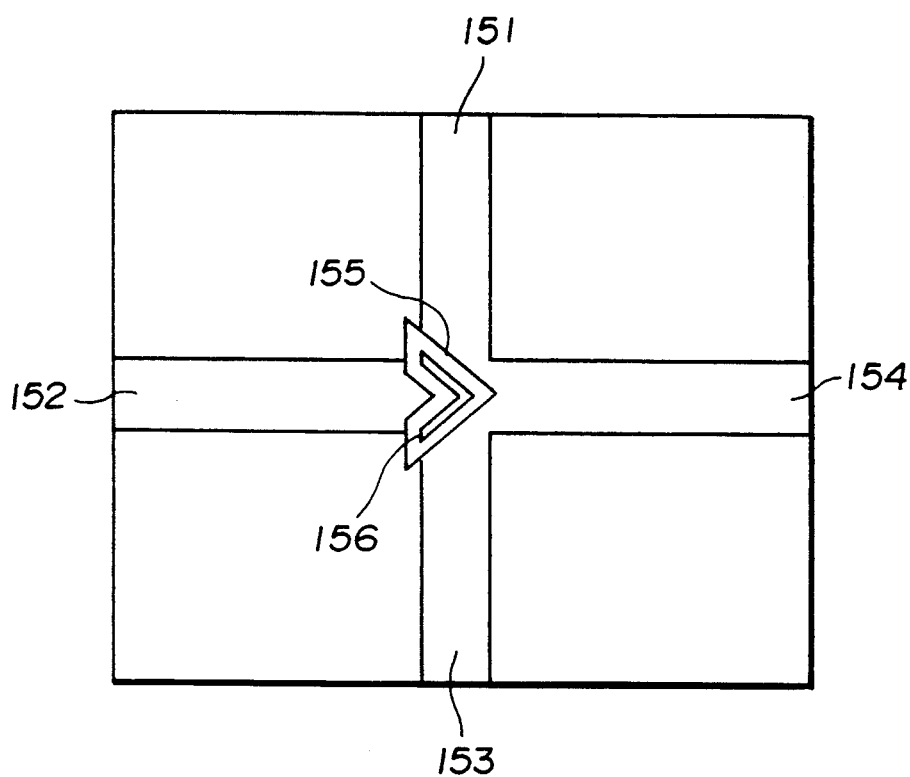
FIG. 7 is a plan view of a second embodiment of an opto-electrical circuit of the present invention.

FIG. 7 is a schematic plan view of a second embodiment of the present invention. In the second embodiment, there are formed four waveguides 151, 152, 153 and 154 intersecting one another at right angles, and an optical coupler/splitter or a coupler portion 155 that functions not only to split a light beam propagated through one of the waveguides 151, 152, 153 and 154 into three directions, but also to combine the light beams propagated through the three waveguides into a light beam propagated through the remaining waveguide 151, 152, 153 or 154. For example, a portion of a light beam propagated through the waveguide 151 is transmitted to the waveguide 153 through a coupler portion 155 while a portion thereof is reflected by an upper side of a V-shaped groove 156 to be guided into the waveguide 154 and a portion thereof is reflected by a lower side of the V-shaped groove 156 to be guided into the waveguide 152.

The fabrication method of this embodiment is substantially the same as that of the first embodiment. Namely, the etching pattern by the RIE method is shaped into a V-shape having a width of the coupler portion 155 as shown in FIG. 7, and the FIBE pattern after the re-growth is made into a V-shape as shown by the groove 156 in FIG. 7. Thus, a structure having the above-discussed function is achieved.

As described in the foregoing, a groove or a recess is formed in the re-grown portion having an appropriate band gap of the coupler portion, so that adverse influences on the damaged semiconductor layer, caused by the FIBE method and the like, can be reduced. As a result, the etching condition can be set without considering the etching damage that will be caused by the FIBE method and the like, so that an integrated optical coupler, an opto-electrical circuit, a compound-resonator and the like all having excellent reliability and reproducibility can be achieved.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An optical device comprising:
   a semiconductor crystal;
   a waveguide for propagating light therethrough and being formed on said semiconductor crystal;
   an etched portion having a predetermined pattern and a predetermined depth, said etched portion being formed in said waveguide;
   a re-grown portion formed in said etched portion of said waveguide; and
   a coupler portion comprising a recess formed in said re-grown portion, said coupler portion effecting at least one of a branching and a combining of the light propagated through said waveguide.

2. An optical device according to claim 1, wherein said waveguide comprises a core layer and said re-grown portion comprises at least one semiconductor layer having a band gap larger than that of said core layer of said waveguide.

3. An optical device according to claim 2, wherein said re-grown portion comprises a light guide layer and a cladding layer.

4. An optical device according to claim 1, wherein said waveguide comprises a core layer, said etched portion has a depth beyond said core layer and said recess is formed in a slit shape beyond said core layer.

5. An optical device according to claim 1, wherein said waveguide comprises a crossing portion and said coupler portion is formed at said crossing portion.

6. An optical device according to claim 1, wherein said recess comprises a curved slit for branching a light wave propagated through said waveguide in a plurality of directions.

7. An optical device according to claim 1, wherein said semiconductor crystal comprises a plurality of layers of compound semiconductor layers, and further comprising a plurality of said waveguides, each comprising an optical device, monolithically integrated on said compound semiconductor layers.

8. A method of fabricating an optical device comprising the steps of:
   providing a semiconductor crystal;
   forming a waveguide on the semiconductor crystal;
   forming a mask material having a predetermined pattern on the waveguide;
   etching a portion of the waveguide to a predetermined depth using the mask material as a mask;
   performing a selective epitaxial re-growth only into a portion etched in said etching step, wherein the re-growth is performed using the mask material as a mask; and
   performing a fine working in an epitaxial re-growth portion formed in said epitaxial re-growth step to form a coupler portion comprising a recess.

9. A method according to claim 8, wherein said etching step comprises an ion beam etching method.

10. A method according to claim 8, wherein said etching step comprises mesa etching.

11. A method according to claim 8, wherein said fine working step comprises a focused ion beam etching method.

12. A method according to claim 8, wherein said epitaxial re-growth step comprises re-growing a light guide layer and a cladding layer.

13. A method according to claim 8, wherein the semiconductor crystal comprises a plurality of layers of compound semiconductor layers, and further comprising providing a plurality of waveguides and an optical device monolithically integrated on the compound semiconductor layers.

* * * * *

UNITED STATES PATENT AND TRADEMARK OFFICE
CERTIFICATE OF CORRECTION

PATENT NO. : 5,249,244
DATED : September 28, 1993
INVENTOR(S) : MAMORU UCHIDA

It is certified that error appears in the above-indentified patent and that said Letters Patent is hereby corrected as shown below:

COLUMN [56] RC
    Under "Mach-Zehnder": "vol. 6, Jun. 1988" should read --vol. 6, No. 6, June 1988,--

COLUMN 2
    line 41, "aa" should read --a--

COLUMN 4
    line 47, "reaction" should read -- reactive --

Signed and Sealed this

Twenty-fourth Day of May, 1994

Attest:

BRUCE LEHMAN

*Attesting Officer*  *Commissioner of Patents and Trademarks*